United States Patent
Patwardhan

(10) Patent No.: US 10,417,180 B1
(45) Date of Patent: Sep. 17, 2019

(54) FAST RECOVERY OF BACKUP CLOUD GATEWAY FOLLOWING CRASH WITHOUT GARBAGE COLLECTION

(71) Applicant: EMC Corporation, Hopkinton, MA (US)

(72) Inventor: Kedar Patwardhan, Prune (IN)

(73) Assignee: EMC IP HOLDING Company, LLC, Hopkinton, MA (US)

( * ) Notice: Subject to any disclaimer, the term of this patent is extended or adjusted under 35 U.S.C. 154(b) by 650 days.

(21) Appl. No.: 14/863,318

(22) Filed: Sep. 23, 2015

(51) Int. Cl.
G06F 16/11 (2019.01)
G06F 11/14 (2006.01)
G06F 13/14 (2006.01)

(52) U.S. Cl.
CPC ........ G06F 16/128 (2019.01); G06F 11/1451 (2013.01); G06F 11/1464 (2013.01); G06F 11/1469 (2013.01)

(58) Field of Classification Search
CPC ............... G06F 17/30575; G06F 3/067; G06F 17/30174; G06F 17/30371; G06F 17/30; G06F 17/30153; G06F 17/3028; G06F 17/30318; G06F 17/30017; G06F 17/3002; G06F 17/30058; G06F 17/30091; G06F 17/30194; G06F 17/30097; G06F 17/30138; G06F 17/30159; G06F 17/30368; G06F 17/30283; G06F 17/30289; G06F 11/1451; G06F 11/1456; G06F 11/1464; G06F 16/273; G06F 16/27; G06F 16/128; G06F 16/275; G06F 16/1752; G06F 11/1448; G06F 11/1446; G06F 11/1469; G06F 16/137; G06F 16/152; G06F 16/2255; G06F 16/125; G06F 16/174; G06F 16/184
USPC ........... 707/634, 827, E17.01, 638, E17.044, 707/E17.107, E17.143, 610, 639, 661, 707/690, 704, 758, 781, 828, E17.007, 707/626, 648, 682, 999.204
See application file for complete search history.

(56) References Cited

U.S. PATENT DOCUMENTS

| | | | |
|---|---|---|---|
| 8,533,231 B2 * | 9/2013 | Aizman | G06F 16/182 707/793 |
| 9,317,213 B1 * | 4/2016 | Gupta | G06F 3/064 |
| 2013/0041872 A1 * | 2/2013 | Aizman | G06F 16/182 707/690 |

* cited by examiner

*Primary Examiner* — Arpan P. Savla
*Assistant Examiner* — Cecile H Vo
(74) *Attorney, Agent, or Firm* — Barry N. Young

(57) ABSTRACT

In a cloud storage system, fast recovery from a crash of a cloud gateway or the cloud storage is afforded without the necessity of traditional garbage collection. Data objects are each broken up into a plurality of chunk objects that are prefixed with a unique non-repeating forever increasing generation number that is incremented for each different data object. The chunk objects of a particular data object are identified and listed in a manifest file that is also associated with that generation number. Upon a crash of either the cloud gateway or the cloud storage, a query identifies the cloud and deletes all orphaned chunk objects prefixed by and all manifest files associated with the prevailing generation number at the time of the crash. The deleted chunk objects and manifest files are regenerated and restored to cloud storage to return to consistency.

17 Claims, 4 Drawing Sheets

FAST RECOVERY OF BACKUP CLOUD GATEWAY FOLLOWING CRASH WITHOUT GARBAGE COLLECTION

BACKGROUND

This invention relates generally to networked data storage and more particularly to garbage collection following a crash of a cloud gateway or cloud storage.

Processing systems are increasingly using cloud storage for storing persistent backup copies of data as file system objects. Typically, a processing system, such as a transactional processing system of an organization, is connected to a cloud gateway comprising a server computer executing a cloud storage application, and having memory and local storage. The cloud gateway interfaces via a network, such as the Internet, to remote "cloud" storage which may comprise distributed storage or a remote data center, for example, and manages the storage and retrieval of processing system backup data onto a file system created on the cloud storage. Generally, the cloud gateway stores backup data of the organization's processing system on the cloud file system by creating data chunks of the backup data, de-duplicating chunks with previous backups, and storing the chunks not already present on the file system. The cloud gateway creates a chunk object for each data chunk, and the object is named with a unique fingerprint of the chunk. Thus, each chunk stored in cloud storage may be accessed by its fingerprint name, and may correspond to some range (start offset, length) of backups. A chunk can correspond to multiple ranges of multiple backups due to de-duplication. The cloud gateway also creates a manifest file that describes the various chunks that comprise a particular backup. The manifest file comprises a chunk map, i.e., a listing of all chunks that are present in a backup image in their order of appearance in the backup image, identifying the chunks by their chunk fingerprints. When recovering a backup, the chunk map is consulted and chunks corresponding to the identified fingerprint names in the manifest file are retrieved and restored in their order of their listing.

If while storing backups onto the cloud file system a cloud gateway or cloud file system were to crash, there would be an inconsistency between the manifest files and the data chunks referred to by the manifest files. This inconsistency can arise since the manifest files may not be stored to cloud storage at the same time the data chunks are stored. As a result, upon a crash occurring, there may be data chunks in cloud storage which are not referenced by any manifest files because the cloud gateway or cloud file system crashed after the data chunk was stored but before the manifest file could be stored. It may also happen that certain manifest files are stored in cloud storage before their corresponding data chunks are stored. In this event, the cloud storage would have manifest files following a crash that refer to data chunks which may or may not be present in cloud storage. In order to return the cloud storage to a state of consistency, a garbage collection process must be performed after a crash.

A conventional garbage collection process iterates through all manifest files that are in cloud storage (there may be thousands of such files) and identifies and lists all data chunks that referred to in each of the manifest files. Next, all data chunks that exist in the cloud storage must be identified and listed. Frequently, these may number in the millions. The identified and listed data chunks must then be correlated against the data chunks present in a manifest file. Any manifest file that refers to a data chunk that is not present in cloud storage must be removed. Additionally, data chunks that are in cloud storage but are not referenced by any manifest file must also be removed. This garbage collection process can be very time-consuming and resource intensive. It may take hours, or days, or even weeks to clean up the cloud storage depending upon the number of manifest files and data chunks that must be scanned, as well as the cloud storage latency.

It is desirable to provide systems and methods that address the foregoing and other known problems of managing cloud storage by enabling the fast, efficient identification and restoration of backup data objects in cloud storage following a crash without the necessity of standard garbage collection. It is to these ends that the present invention is directed.

DESCRIPTION OF PREFERRED EMBODIMENTS

The invention involves a new and improved process for storing backup data that minimizes the time and resources required to recover from a crash by obviating conventional garbage collection. The invention is particularly applicable to cloud storage of transactional data, and it will be described in that context. It will be appreciated, however, that this is illustrative of only one utility of the invention, and that the invention is also applicable to other types of data and to other types of storage systems.

Figure 1:
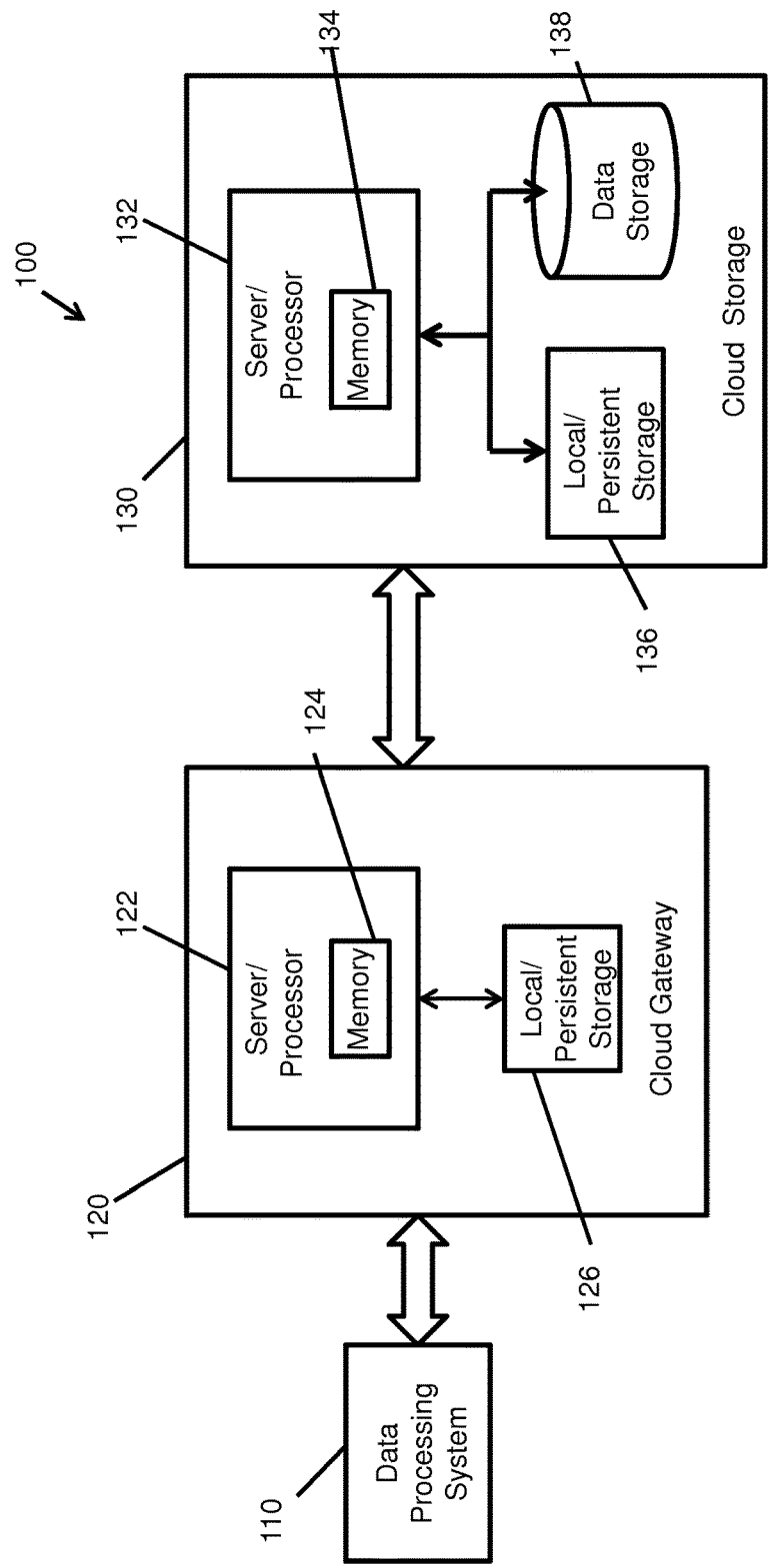
FIG. 1 is a block diagram giving an overview of a data processing operation and system utilizing cloud storage for data backup in which the invention may be employed.

FIG. 1 is a block diagram of an embodiment of a data processing and storage system 100 employing cloud storage for storing backup data objects with which the invention may be employed. System 100 may comprise a data processing system 110, which in an embodiment may be a networked enterprise data processing system for processing transactional data, for example. Data processing system 110 may be interfaced to a cloud gateway 120 which, in turn, is interfaced to cloud-based storage 130. The cloud gateway may be an appliance comprising a server/processor 122 having a memory 124 for storing executable instructions (software applications) for controlling the server/processor, and for, among other purposes as will be described, interfacing between applications of the data processing system and APIs of the cloud storage infrastructure to manage the storage and retrieval of backup images of data objects. The cloud gateway may further include local persistence storage 126 for storing metadata about data objects and generation numbers, as will be described.

Among other functions, the cloud gateway may receive processing system backup data objects such as files or groups of files, break the files up into data chunks, and create a chunk object for each data chunk for storage in the cloud infrastructure. The cloud gateway also preferably creates a unique fingerprint for each chunk object comprising, for example, a hash of the chunk object that uniquely identifies that chunk object, and creates a manifest file comprising a listing of all chunk objects created from a backup object to form a backup image for storage on the cloud. Each chunk object that is stored in the cloud storage may be accessed by its fingerprint identifier, and the manifest file comprises a chunk map which is a listing of all chunk objects present in a backup (object) image identifying the chunks by their fingerprints and their order of appearance in the backup object. Each chunk corresponds to a certain portion of the backup object having a range corresponding to a starting offset and data length within the backup object. The cloud gateway may additionally perform other functions such as the de-duplicating chunks with other previous backups. An example of a cloud gateway system which may be used is Maginatics Mag FS available from the assignee of the present invention.

Cloud storage 130 may be an Internet-based storage infrastructure, for example, that creates and provides a cloud file system for storing backup data objects. It may comprise a server/processor 132 having memory 134 for storing executable instructions for controlling the operations of the server/processor and including APIs for interfacing with the cloud gateway. Preferably, the cloud storage software is S3 compliant which is a de facto open standard that allows stored objects in cloud storage to be indexed and retrieved by their prefixes. Additionally, the cloud storage may comprise local persistence storage 136 for storing metadata including manifest files about backup data objects and generation numbers, and additionally comprise primary data storage 138 for storing actual backup data such as chunk objects. Data storage 138 may comprise a centralized data center or distributed storage spanning multiple locations and servers.

When recovering a backup following a crash, the relevant chunk map (manifest file) may be consulted and the chunk objects corresponding to the listed fingerprint names may be retrieved and restored in their order of listing in the manifest file to recover the backup object.

In a typical cloud storage system, if while storing backups into the cloud file system the cloud gateway or the cloud file system were to crash, there could be an inconsistency between the manifest files and the data chunks referenced by the manifest files. This may arise since a manifest file may not be stored to the cloud storage at the same time as its corresponding data chunks are stored on cloud storage, and because chunk objects are not necessarily stored in the cloud storage in any particular order. Accordingly, upon a crash, there may exist data chunk objects in cloud storage which are not referenced by any manifest files, because the cloud gateway or cloud file system crashed after the data chunk object was stored in the cloud but before the manifest file could be stored. Additionally, certain manifest files may be stored to cloud before their corresponding data chunks. In such cases, the cloud storage would have manifest files that refer to data chunks which may or may not be present in the cloud storage following a crash. In a conventional cloud storage system in order to return the cloud storage back to consistency following a crash, a garbage collection process must be performed. Conventionally, this garbage collection process iterates through all manifest files that are in cloud storage and identifies and lists all data chunk objects which are referred to in each of the manifest files. Then, all chunk objects that exist in the cloud storage are scanned and identified and compared to the listing of data chunk objects from the manifest files. In the garbage collection process, a manifest file that refers to a chunk object which is not present in cloud storage must be removed from cloud storage. Also chunk objects which are not referred to by any manifest file are removed from cloud storage. In conventional cloud storage system the number of chunk objects that can exist may number in the millions of objects. The process of scanning and identifying all manifest files and data chunk objects for garbage collection may take hours, days or even weeks depending upon the number of manifest files, the number of chunk objects, and the cloud storage latency.

The invention affords a different process for storing backup data objects in cloud storage and an improved system of the type illustrated in FIG. 1 that avoids the necessity of conventional garbage collection following a crash. Rather, the invention affords a fast, simple and efficient crash recovery process to restore consistency to a cloud gateway and to cloud storage following a crash that does not involve conventional garbage collection. Instead, the invention allows all inconsistent chunk objects and manifest files to be quickly identified and removed to restore the gateway and the cloud to consistency. As will be described, the invention accomplishes this by changing the manner in which chunk objects of backup data objects are conventionally designated and listed in manifest files. The invention identifies all chunk objects of a particular data object backup and the corresponding manifest file(s) with a unique number as a prefix that is referred to herein as a generation number. Upon a crash occurring during the processing of a particular backup object, the unique generation number prefix for that backup object is used to rapidly identify the corresponding chunk objects and manifest files. Orphaned chunk objects and manifest files affected by the crash are deleted, and then are regenerated and restored. This can be done much faster than scanning, identifying and matching chunk objects and manifest file entries as done in conventional garbage collection. The manner in which the invention accomplishes as will be described below.

Figure 2:
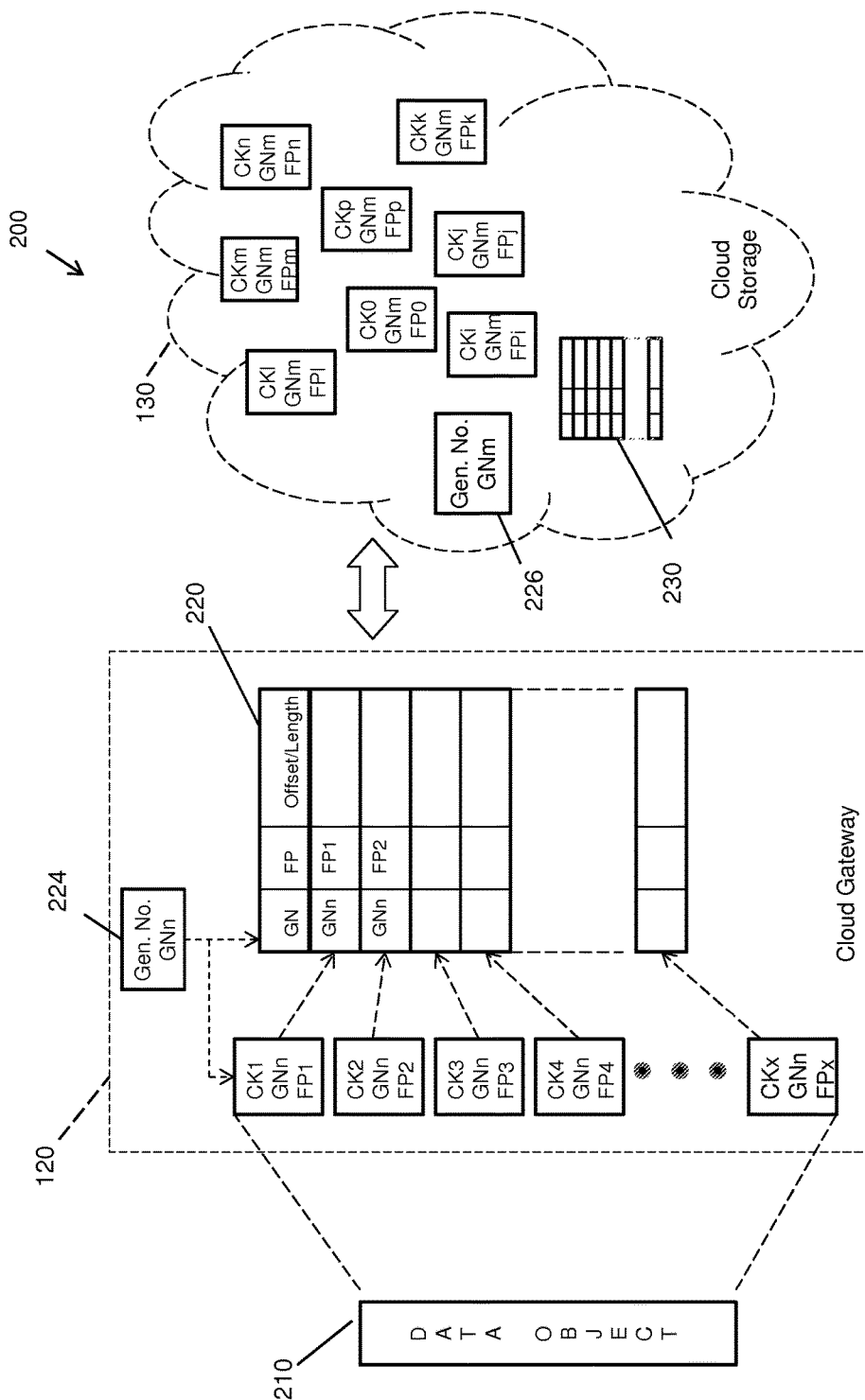
FIG. 2 is an overview of a cloud storage process in accordance with the invention for storing backup data objects in the system of FIG. 1.
Figure 3:
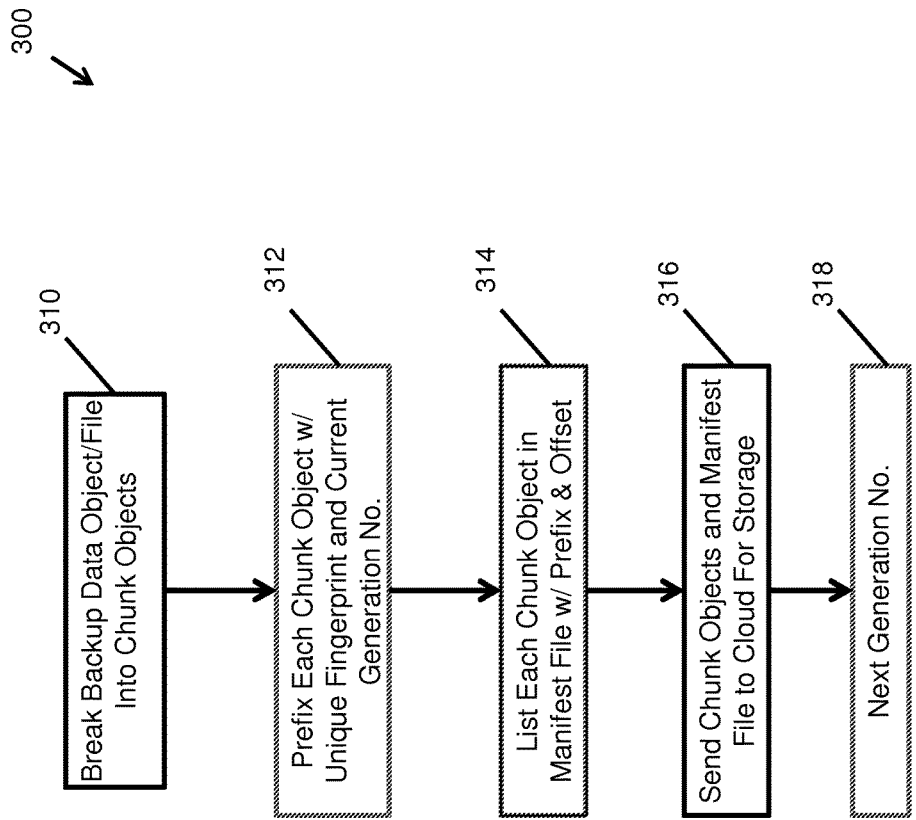
FIG. 3 illustrates an embodiment of a workflow in accordance with the invention for storing backup data objects in the cloud storage process of FIG. 2.

FIG. 2 is an overview of an embodiment of a cloud storage process 200 in accordance with the invention for storing backup data objects in the system of FIG. 1, and FIG. 3 is an embodiment of a workflow 300 of the process of FIG. 2. FIGS. 2 and 3 will be used together to describe a preferred embodiment of the invention for storing backup data objects to cloud storage.

Referring to FIGS. 1 and 2, a data object 210 of data processing system 110 for which a backup is desired is processed by the cloud gateway 120. Data object 210 may be a file, a portion of a file, or a group of files. The server/processor 122 of the cloud gateway using software applications stored in memory 124 may break the data object 210 up into a plurality, x, of chunk objects CK1, CK2 . . . CKx as shown in FIG. 2 and at 310 in FIG. 3, where each "chunk" comprises a portion of the data object. The cloud gateway may additionally generate for and prefix each chunk object with a corresponding unique fingerprint FP1, FP2 . . . FPx, as shown in FIG. 2 and in FIG. 3 at 312. The fingerprints uniquely identify their corresponding chunk objects, and may comprise a hash, for example, of the chunk object. As each chunk object is created, the cloud gateway may list the chunk object with its unique fingerprint and with a corresponding offset and length from a starting reference location or address in data object 210, in one or more manifest files 220 (FIG. 2), as indicated at 314 in FIG. 3. The manifest files 220 will, therefore, comprise a chunk map that lists all of the chunk objects, identified by their corresponding unique fingerprints that are present in the backup data object 210 in their order of appearance in the data object. Accordingly, as will be described in connection with FIG. 4, when recovering a backup image from cloud storage, the chunk map may be consulted and chunk objects can retrieved using their fingerprint names and restored in their order of listing in the manifest files to recover the backup image.

The invention affords a new way in which chunk objects are named, stored and retrieved from the cloud that enables a quick, efficient recovery of the cloud storage following a crash. In accordance with a preferred embodiment of the invention, the cloud gateway may create a unique generation number for each backup data object 210 that is to be stored in cloud storage, and prefix each chunk object, CKx, that is created from that data object 210 and its corresponding manifest file 220 with the same unique generation number, as shown in FIG. 2 and as indicated at 312 in FIG. 3. The generation number is preferably a non-repeating number that is sequentially, or preferably consecutively, incremented so that it always changes with each increment, although the generation number may also be a non-repeating number having a rank value or count that readily distinguishes its position in a sequence relative to previous numbers. A new (next) sequential generation number is preferably generated for each new backup data object. It may be generated by the server/processor 122 of the cloud gateway or by an incrementing counter, for example. Each chunk object that is created from a backup data object is listed in the manifest file 220 with a prefix comprising the current generation number prevailing at its creation in combination with the fingerprint of the chunk object. Each chunk object is also preferably listed with its offset and length from a reference location in the backup data object, as shown in FIG. 2 and as indicated at 314 in FIG. 3. At periodic intervals, such as hourly, the cloud gateway flushes all manifest files and data chunk objects to cloud storage such that the cloud storage becomes consistent, as indicated at 316 in FIG. 3. After a flush of the chunk objects and the manifest files(s), the cloud gateway may then forward the relevant generation number used as a prefix for the chunk objects and the manifest files to cloud storage for storage in persistent storage 226, and may generate a next generation number for use with the next backup data object. The cloud gateway preferably also maintains copies of the flushed manifest files containing the chunk object prefixes (generation numbers and fingerprints) and their offsets/lengths in its persistent storage 126 (FIG. 1). The chunk objects, themselves, are stored permanently only in the cloud storage.

To store a backup data object 210 to cloud storage, the cloud gateway transmits both the manifest files as well as data chunk objects referred to in the manifest files to the cloud storage, although not necessarily together. The cloud gateway may prefix the name of each manifest file with the current generation number that was currently prevailing at the time of the backup, and prefix each data chunk object name (fingerprint) with the currently prevailing generation number. Accordingly, a manifest file and its corresponding chunk objects are identified by the same generation number. After flushing a manifest file and its corresponding chunk objects to cloud storage, the cloud gateway may then increment the current generation number to the next consecutive number (or otherwise increment the number's rank to a next higher rank in the sequence), as shown at 318 in FIG. 3, and use that next consecutive number as a prefix for chunk objects of the next data object and associated manifest file(s) to be stored in cloud storage. The cloud gateway preferably stores the generation numbers persistently in persistent storage 224 of the cloud gateway 120 and in the persistent storage 226 of the cloud storage 130. FIG. 2 illustrates this diagrammatically.

FIG. 2 illustrates diagrammatically the states of the cloud gateway 120 and cloud storage 130 following a flush of the cloud gateway chunk objects and corresponding manifest file(s) to cloud storage. In the state shown in the figure, a plurality of chunk objects CKi, CKj . . . CKp and a corresponding manifest file 230 have been stored in cloud storage 130 prefixed with the generation number GNm. The manifest file 230 lists all of this plurality of chunk objects prefixed with generation number GNm and with their corresponding fingerprints. This generation number, GNm, may also have been stored in persistent cloud storage memory 226, as indicated. Thus, the cloud storage stores a plurality of chunk objects and their corresponding manifest files, and is internally consistent.

Following the flush to cloud storage, the cloud gateway 220 is shown in FIG. 2 as having incremented the generation number GNm to the next consecutive generation number GNn, as having stored the new generation number in the memory 224, as having created a plurality of chunk objects CK1, CK2 . . . CKx from data object 210 prefixed with the next generation number, GNn, and with their corresponding fingerprints FP1, FP2, . . . FPx, respectively, and as listing the chunk objects with their prefixes, offsets and lengths in the manifest file 220 in their order of occurrence in the data object. Upon the cloud gateway flushing this next set of chunk objects and the corresponding manifest file to cloud storage, the cloud gateway may increment the generation number and repeat the process with the next backup data object. Accordingly, each chunk object in cloud storage is identified by its unique fingerprint as well as by its generation number, and each manifest file in cloud storage is similarly identified by the generation number of the chunk objects that are listed in that manifest file. Importantly, this flushing by the cloud gateway at regular periodic intervals makes the cloud storage consistent, and the naming of related chunk objects using a common unique generation number as a prefix in accordance with the invention makes recovery from a crash very fast and efficient, as will now be described.

Figure 4:
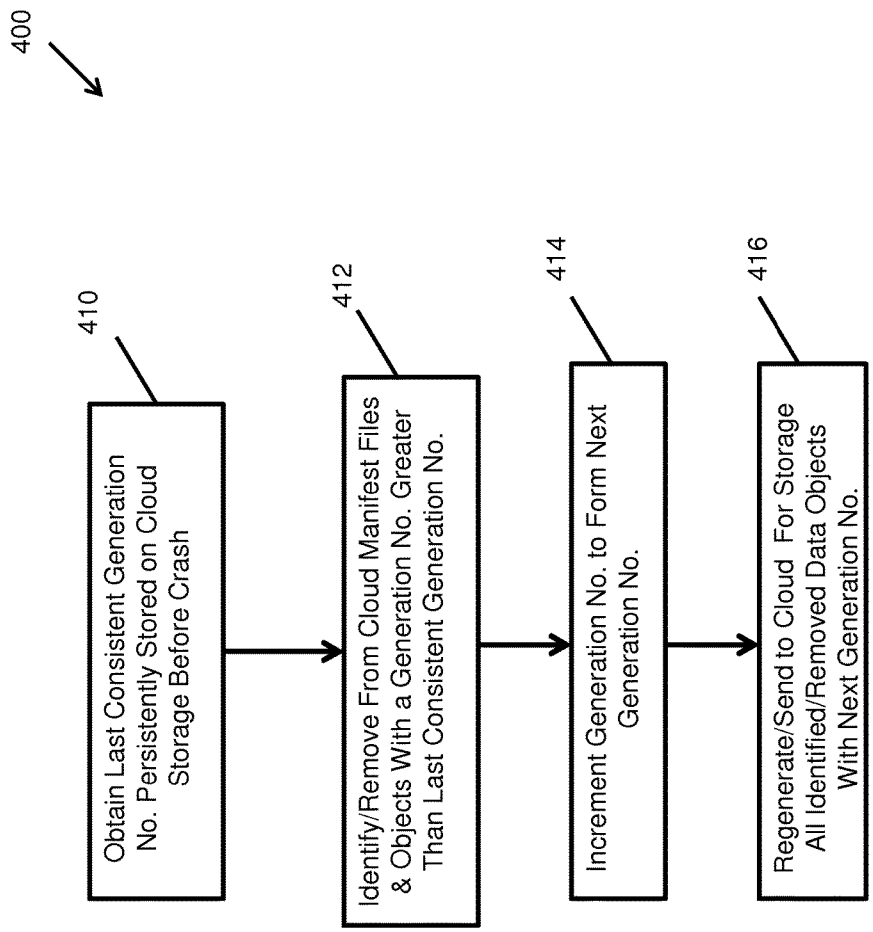
FIG. 4 illustrates a process in accordance with the invention for quickly and efficiently recovering from a cloud gateway or a cloud storage system crash without the necessity of conventional garbage collection.

FIG. 4 illustrates a process 400 in accordance with the invention for recovering from a cloud gateway or cloud storage crash. Following a crash of either the cloud gateway or the cloud storage, the cloud gateway obtains the last generation number that was persistently stored on cloud storage before the crash, as indicated 410, as, for instance, by sending a query to the cloud storage. The state of the cloud storage corresponding to this last generation number corresponds to the state of the cloud storage at the last flush and is consistent up to that time. This last number may be referred to as the last consistent generation number. Next, at 412, the cloud gateway identifies and removes all manifest files and all chunk objects prefixed by a generation number that is greater than the last consistent generation number. The presence of objects in cloud storage having a generation number greater than the last consistent generation number means that the objects were stored in the cloud storage before the corresponding flush of the cloud gateway could be completed. Thus, while some of the chunk objects with inconsistent generation numbers may have been stored correctly to cloud storage, they may be incomplete and those that were stored do not necessarily represent the data object from which they were generated. Accordingly, these chunk objects and the backup image are inconsistent.

In order to return the cloud storage to a current consistent state, the invention does not waste time and resources attempting to recover lost objects and manifest files, as was done in conventional garbage collection. Accordingly, it is unnecessary to read the contents of all manifest files, identify data chunks, and compare the chunks to the manifest files to determine which ones are references and which ones are orphaned, and, therefore, avoids these burdens of conventional garbage collection. Instead, the invention simply identifies the inconsistent chunk objects and manifest files, and removes them. Since the invention periodically renders the cloud storage consistent by flushing chunk objects and manifest files to the cloud, it substantially reduces the amount of data that must be handled following a crash. Moreover, as noted above, the cloud storage software is preferably S3 compliant, which enables stored objects to be quickly searched, identified and retrieved by their prefix. This enables chunk objects and manifest files to be quickly identified and accessed by their generation number prefix without the necessity of reading their contents, and enables the invention to quickly remove inconsistent objects and manifest files.

Instead of trying to identify and recover objects to return the cloud storage to consistency following a crash, the invention returns the cloud storage to a consistent state in a different way. It simply regenerates the removed inconsistent orphaned objects and manifest files. The invention preferably accomplishes this, as shown at 414, by incrementing the last consistent generation number to form a new generation number, and then, as shown at 416, by regenerating and resending to the cloud storage the chunk objects and the corresponding manifest file(s) of the backup data object that were removed. Since backup data objects are typically files or groups of files, the data objects are not very large, and re-creating chunk objects and associated fingerprint and generation number prefixes can be done quite rapidly, typically in a matter of seconds rather than in hours, days or weeks. Thus, the invention avoids traditional garbage collection and affords a very fast recovery from a crash.

While the foregoing has been with reference to particular embodiments of the invention, it will be appreciated by this skilled in the art that changes can be made to these embodiments without departing from the principles and spirit of the invention, the scope of which is defined in the appended claims.

The invention claimed is:

1. A method of recovering from a crash of a system that stores backup images of data objects in backup storage without the necessity of garbage collection, comprising:

creating a plurality of chunk objects from a data object to be backed up, for a each chunk object comprising a different portion of said data object;

generating for each chunk object a unique fingerprint;

assigning a generation number to said data object, said generation number comprising a unique non-repeating number that identifies a time of storage of said data object in backup storage relative to other data objects;

prefixing each of said plurality of chunk objects created from said data object with said generation number assigned to said data object from which each of said chunk objects was created and with said unique fingerprint of each said chunk object to identify each of said plurality of chunk objects and to associate each of said chunk objects with said data object from which each chunk was created;

listing in a manifest file for said data object each of said prefixed chunk objects in an order of appearance of said chunk object in said data object, and assigning to said manifest file as an identifier the same generation number as assigned to said data object;

storing said prefixed chunk objects in backup storage and storing said manifest file in persistent storage;

upon a crash of said system occurring, deleting all chunk objects from said backup storage that are prefixed by a generation number that is later than a last generation number that was persistently stored prior to said crash; and recreating using said manifest file and unique fingerprint and storing in said backup storage prefixed with a new generation number replacement chunk objects corresponding to said deleted chunk objects to return said backup storage to a consistent state.

2. The method of claim 1, wherein said generation number comprises a forever increasing number that is consecutively incremented for each new data object.

3. The method of claim 1, wherein said generation number comprises a number of a sequence that has a value that distinguishes its relative rank in the sequence to other numbers of the sequence.

4. The method of claim 1 further comprising associating each chunk object with an offset and a length of said each chunk object relative to a reference location in said data object.

5. The method of claim 4 further comprising upon a crash deleting said manifest file corresponding to said data object.

6. The method of claim 1, wherein said backup storage comprises cloud storage, and said creating, said generating and said prefixing are performed by a cloud gateway communicating with said data processing system, and wherein said manifest file is additionally stored in a cloud gateway interfaced to said data processing system.

7. The method of claim 6, wherein said cloud gateway generates said generation number, and stores said generation number and said manifest file in persistent storage in said cloud gateway.

8. The method of claim 6, wherein said cloud storage comprises persistent storage, and said manifest file and said generation number are stored in persistent storage.

9. A method of recovering from a crash of a system that stores backup images of data objects in cloud storage without the necessity of garbage collection, comprising:

breaking up a data object into a plurality of chunk objects, each chunk object comprising a different portion of said data object;

creating for and associating with each chunk object a fingerprint that uniquely identifies said chunk object;

assigning a generation number to said data object and prefixing the same generation number to each of said plurality of chunk objects created from said data object, said generation number comprising a unique number that identifies a time of storage of said data object in backup storage relative to other data objects, and that associates each of said plurality of chunk objects with said data object;

listing each of said prefixed chunk objects in a manifest file in order of their appearance in said data object along with metadata indicating a location of each chunk object in said data object;

storing said plurality of chunk objects prefixed with said generation number in said cloud storage;

upon a crash of said system occurring, deleting all chunk objects in cloud storage having with a generation number that is greater than a last consistent generation number that was associated with a consistent state of the cloud storage prior to the crash; and recreating in cloud storage using said manifest file and said fingerprint replacement chunk objects for said chunk objects that were deleted to return said cloud storage to a consistent state.

10. The method of claim 9, wherein said generation number is consecutively incremented.

11. The method of claim 9 further comprising, identifying said manifest file by said generation number.

12. The method of claim 9 further comprising storing said manifest file and said generation number in persistent storage in said cloud storage and in a cloud gateway interfaced to said cloud storage.

13. Non-transitory computer readable media storing executable instructions for controlling the operations of a computer to recover from a crash of a system that stores backup images of data objects in cloud storage without the necessity of garbage collection, comprising:

creating a plurality of chunk objects from a data object, each chunk object comprising a different portion of said data object;

generating for each data chunk a unique fingerprint;

assigning a generation number to said data object, said generation number comprising a unique non-repeating number that identifies a time of backup of said data object in backup storage relative to other data objects;

prefixing each of said plurality of chunk objects created from said data object with said generation number assigned to said data object from which each of said chunk objects was created and with said unique fingerprint of each said chunk object to identify each of said plurality of chunk objects as having been created from said data object;

listing each of said prefixed chunk objects in a manifest file in order of their appearance in said data object, and assigning to said manifest file as an identifier the same generation number as assigned to said data object;

upon a crash of said system occurring, deleting all chunk objects from said cloud storage that are prefixed by a generation number that is later than a last generation number that was persistently stored prior to said crash; and recreating using said manifest file and said unique fingerprint and storing new replacement chunk objects for said chunk objects of said data object that were deleted to return said storage to a consistent state.

14. The non-transitory computer readable media of claim 13, wherein said generation number comprises a forever increasing number that is consecutively incremented for each new data object.

15. The non-transitory computer readable media of claim 13 further comprising associating each chunk object with an offset and a length of each chunk object relative to a reference location in said data object.

16. The non-transitory computer readable media of claim 15 further comprising upon a crash deleting said manifest file corresponding to said data object.

17. The non-transitory computer readable media of claim 13, further comprising a cloud gateway that interfaces with said cloud storage, and storing said manifest file and said generation number in persistent storage in said cloud gateway and in said cloud storage.

* * * * *